United States Patent
Datta Gupta et al.

(10) Patent No.: US 10,632,926 B2
(45) Date of Patent: Apr. 28, 2020

(54) VEHICLE SENSOR SYSTEM

(71) Applicant: Ford Global Technologies, LLC, Dearborn, MI (US)

(72) Inventors: Somak Datta Gupta, Novi, MI (US); Adil Nizam Siddiqui, Farmington Hills, MI (US); Mahmoud Yousef Ghannam, Canton, MI (US); Jonathan Diedrich, Carleton, MI (US); Cynthia M. Neubecker, Westland, MI (US); Brian Bennie, Sterling Heights, MI (US); Cheri Lyn Hansen, Canton, MI (US); Haron Abdel-raziq, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 13 days.

(21) Appl. No.: 15/702,667

(22) Filed: Sep. 12, 2017

(65) Prior Publication Data
US 2019/0077318 A1    Mar. 14, 2019

(51) Int. Cl.
| | |
|---|---|
| *B60R 1/10* | (2006.01) |
| *G02B 23/02* | (2006.01) |
| *B60S 1/46* | (2006.01) |
| *B60S 1/56* | (2006.01) |
| *G02B 27/01* | (2006.01) |
| *G02B 26/08* | (2006.01) |
| *G02B 7/182* | (2006.01) |

(52) U.S. Cl.
CPC ............... *B60R 1/10* (2013.01); *B60S 1/46* (2013.01); *B60S 1/56* (2013.01); *G02B 23/02* (2013.01); *G02B 26/0816* (2013.01); *G02B 27/0101* (2013.01); *G02B 7/1821* (2013.01)

(58) Field of Classification Search
CPC .... B60R 1/10; B60R 1/00; B60R 1/04; B60R 1/12; B60R 2001/1215; B60R 2001/1253; B60R 11/04; B60R 2011/0033; B60R 2011/004; B60R 2011/0085; B60R 2011/0092; B60R 2011/0094; B60R 2300/107; G02B 27/0101; G02B 23/02; G02B 2027/014; G02B 23/16; G02B 23/18; G02B 26/0833; G02B 7/182; G02B 7/1821; G02B 7/198; B60S 1/56; B60S 1/46; B60K 2350/2052; B60K 2350/1096; B08B 5/02; B08B 1/00; B08B 1/006; B08B 1/04
USPC ....... 359/865, 850, 854, 855, 856, 857, 862, 359/871, 872, 877
See application file for complete search history.

(56) References Cited

U.S. PATENT DOCUMENTS

| | | | |
|---|---|---|---|
| 4,687,310 A * | 8/1987 | Cuvillier | G03B 35/08 396/324 |
| 5,172,235 A | 12/1992 | Wilm et al. | |
| 5,727,242 A | 3/1998 | Lo et al. | |

(Continued)

*Primary Examiner* — Jade R Chwasz
(74) *Attorney, Agent, or Firm* — Frank A. MacKenzie; Bejin Bieneman PLC

(57) ABSTRACT

A system includes a base having a first window and a second window spaced from the first window. The system includes an optical sensor supported by the base. The system includes a mirror supported by the base and movable between a first position and a second position. In the first position the mirror directs light from the first window to the sensor. In the second position the mirror directs light from the second window to the sensor.

15 Claims, 8 Drawing Sheets

(56) References Cited

U.S. PATENT DOCUMENTS

| | | | |
|---|---|---|---|
| 6,607,606 B2 * | 8/2003 | Bronson | B08B 17/02 |
| | | | 134/104.1 |
| 7,162,153 B2 * | 1/2007 | Harter, Jr. | G02B 27/1066 |
| | | | 396/331 |
| 7,172,300 B2 | 2/2007 | Plaster | |
| 7,437,066 B2 * | 10/2008 | Miyoshi | H04N 13/218 |
| | | | 396/324 |
| 8,077,201 B2 * | 12/2011 | Wimmer | B60R 11/04 |
| | | | 348/146 |
| 2011/0141535 A1 * | 6/2011 | Westcott | H04N 1/00002 |
| | | | 358/505 |
| 2012/0000024 A1 | 1/2012 | Layton | |
| 2016/0241764 A1 * | 8/2016 | Luo | H04N 5/2259 |

\* cited by examiner

VEHICLE SENSOR SYSTEM

BACKGROUND

A vehicle may receive information from an optical sensor. The information from the optical sensor may be used to navigate the vehicle, e.g., to avoid vehicle collisions, maintain a lane of travel, etc. However, the optical sensor may be rendered wholly or partially inoperable, e.g., when a contaminant such as dirt blocks a field of view of the sensor.

DETAILED DESCRIPTION

Figure 1:
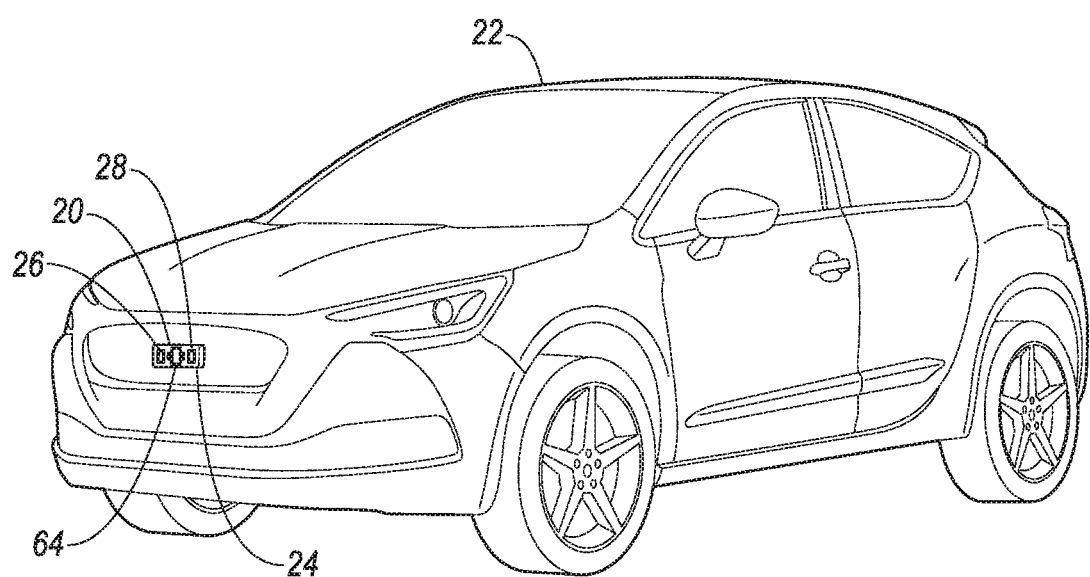
FIG. 1 is a perspective view of an example vehicle with an example sensor system.

A system includes a base having a first window and a second window spaced from the first window. The system includes an optical sensor supported by the base. The system includes a mirror supported by the base and movable between a first position and a second position. In the first position the mirror directs light from the first window to the sensor. In the second position the mirror directs light from the second window to the sensor.

The mirror may include a first reflective surface that directs light to the sensor in the first position and a second reflective surface that directs light to the sensor in the second position.

The system may include a second mirror positioned to direct light from the first window to the mirror in the first position.

The second mirror may be immovably supported by the base.

The second mirror may be rotatably supported by the base.

The system may include a baffle supported by the base and disposed between the first window and the second window.

The system may include a shutter movable between an open position permitting light to travel from the first window to the mirror and a closed position restricting light traveling from the first window to the mirror.

The system may include a cleaning mechanism configured to clean the first window.

The base may define a chamber, and the sensor and mirror may be disposed within the chamber.

The system may include a servo coupled to the mirror and operable to rotate the mirror between the first position and the second position.

The first window and the second window may face a same direction.

A system includes a computer programmed to actuate a mirror to move from a first position in which the mirror directs light from a first window to an optical sensor to a second position in which the mirror directs light from a second window to the optical sensor.

The computer may be programmed to actuate the mirror upon a determination that the first window is contaminated.

The computer may be programmed to actuate the mirror upon a determination that the first window is more contaminated than the second window.

The computer may be programmed to actuate a shutter from an open position permitting light to travel from the first window to the mirror to a closed position restricting light traveling from the first window to the mirror.

The computer may be programmed to, upon actuation of the shutter from the open position to the closed position, actuate a second shutter to an open position permitting light to travel from the second window to the mirror.

The computer may be programmed to actuate a cleaning mechanism to clean the first window upon actuating the mirror to move from the first position to the second position.

The computer may be programmed to actuate movement of a second mirror positioned to direct light from the first window to the mirror in the first position to alter a field of view of the sensor.

The computer may be programmed to actuate a first shutter to a closed position restricting light traveling from the first window to the mirror, and to actuate a second shutter to a closed position restricting light traveling from the second window to the mirror while the first shutter is in the closed position.

The computer may be programmed to navigate a vehicle based on data received from the sensor.

With reference to the Figures, a sensor system 20 for a vehicle 22 includes a base 24 having a first window 26 and a second window 28 spaced from the first window 26. The sensor system 20 includes an optical sensor 30 supported by the base 24. The sensor system 20 includes a mirror 32 supported by the base 24 and movable between a first position and a second position, in the first position the mirror 32 directs light from the first window 26 to the optical sensor 30, and in the second position the mirror 32 directs light from the second window 28 to the optical sensor 30. The sensor system 20 protects the optical sensor 30 and aids in maintaining an uncontaminated field of view FV.

The base 24 may define a chamber 34. For example, the base 24 may include walls 25, a top panel 27, a bottom panel 29, etc., to enclose the chamber 34 and protect components therein from conditions such as rain, snow, dirt, etc., as shown in FIGS. 2 through 5. The chamber 34 may be partially or completely enclosed by the base 24. The base 24 may include one or more tracks 36. Each track 36 may be defined by one or more channels, grooves, lips, etc. The base 24 may be a component of the vehicle 22.

The base 24 has the first window 26 and the second window 28. Each of the windows 26, 28 permits light to pass therethrough. Each of the windows 26, 28 may be a transparent material that permits light to enter the chamber 34 while inhibiting other material, e.g., solid, liquid, or gas, from passing therethrough. For example, each window 26, 28 may be a lens. The transparent material may be common, e.g., a single sheet of material, for both windows 26, 28. The transparent material may be glass, such as laminated glass, tempered glass, etc., or plastic such as Plexiglas, polycarbonate, etc., or any other suitable material.

The second window 28 is spaced from the first window 26. The spacing between the windows 26, 28 may be of a sufficient amount to reduce a likelihood of contamination of both windows 26, 28 at a same time. For example, the spacing may be such that it is unlikely that a contaminant affecting the first window 26, e.g., water and dirt splashed on the first window 26 during operation of the vehicle 22, will also affect the second window 28.

The first window 26 and the second window 28 may face a same direction. For example, an object that generates and/or reflects light into the first window 26 may also generate and/or reflect light into the second window 28.

The optical sensor 30 may be a scanning laser range finder, a light detection and ranging (LIDAR) device, an image processing sensor such as camera, or any other sensor that detects light. The optical sensor 30 may generate data representing an image 31 captured by the optical sensor 30. The optical sensor 30 is supported by the base 24. For example, the optical sensor 30 may be secured to the bottom panel 29, one of the walls 25, etc., e.g., with an adhesive, one or more fasteners, etc. The optical sensor 30 may be disposed within the chamber 34.

The mirror 32 includes a first reflective surface 38 that reflects light. The mirror 32 may include a second reflective surface 40 that reflects light. The first reflective surface 38 may be opposite the second reflective surface 40. The first reflective surface 38 may be parallel to the second reflective surface 40. The first reflective surface 38 may be transverse to the second reflective surface 40. The first reflective surface 38 and the second reflective surface 40 may be flat or may be curved.

The mirror 32 is supported by the base 24. For example, the mirror 32 may be supported by the bottom panel 27. The mirror 32 may be disposed within the chamber 34.

Figure 2:
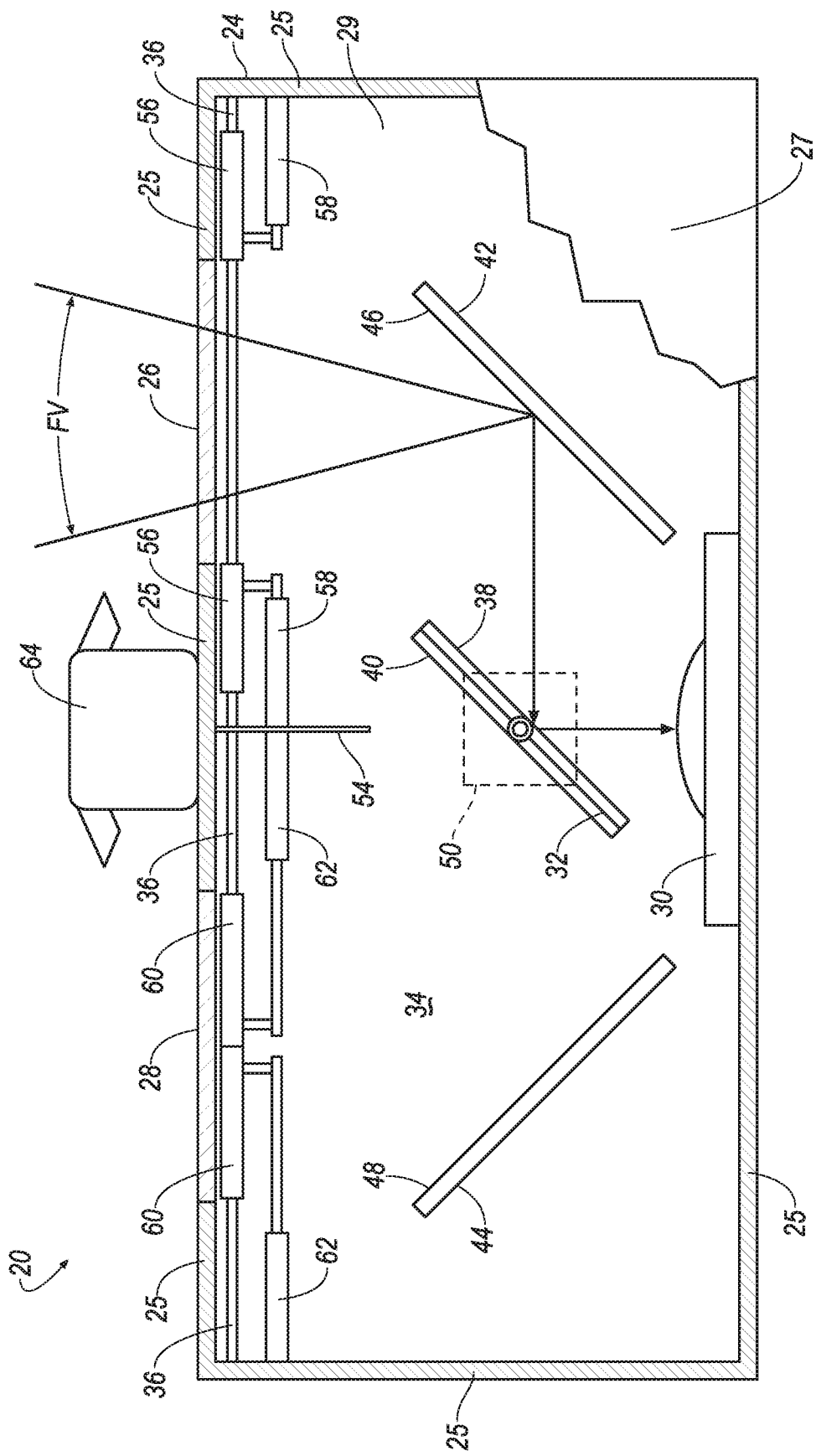
FIG. 2 is a top breakaway view of the example sensor system of FIG. 1.
Figure 3:
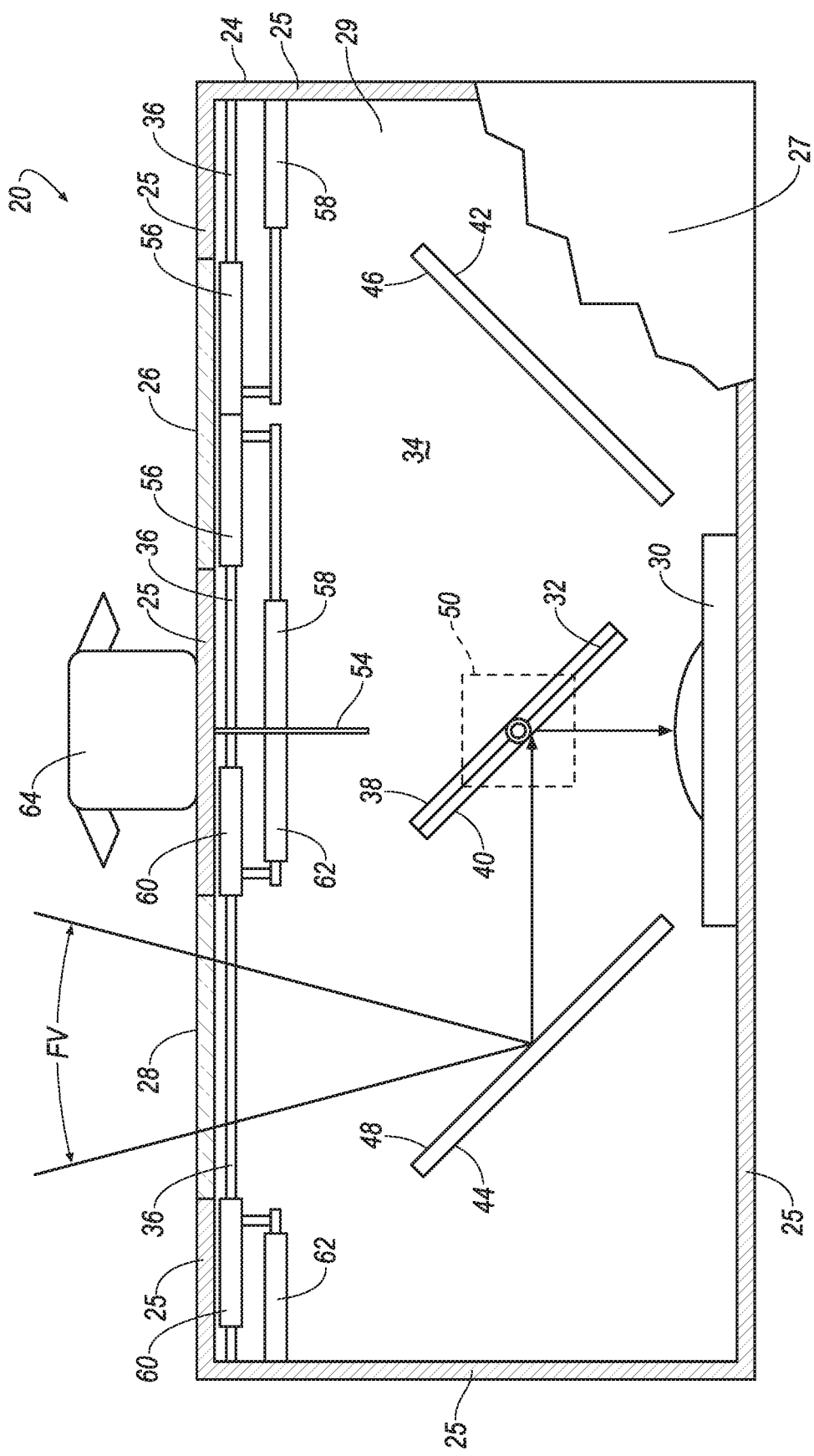
FIG. 3 is a top breakaway view of the example sensor system of FIG. 1 with shutters and a mirror of the sensor system in alternate positions.
Figure 4:
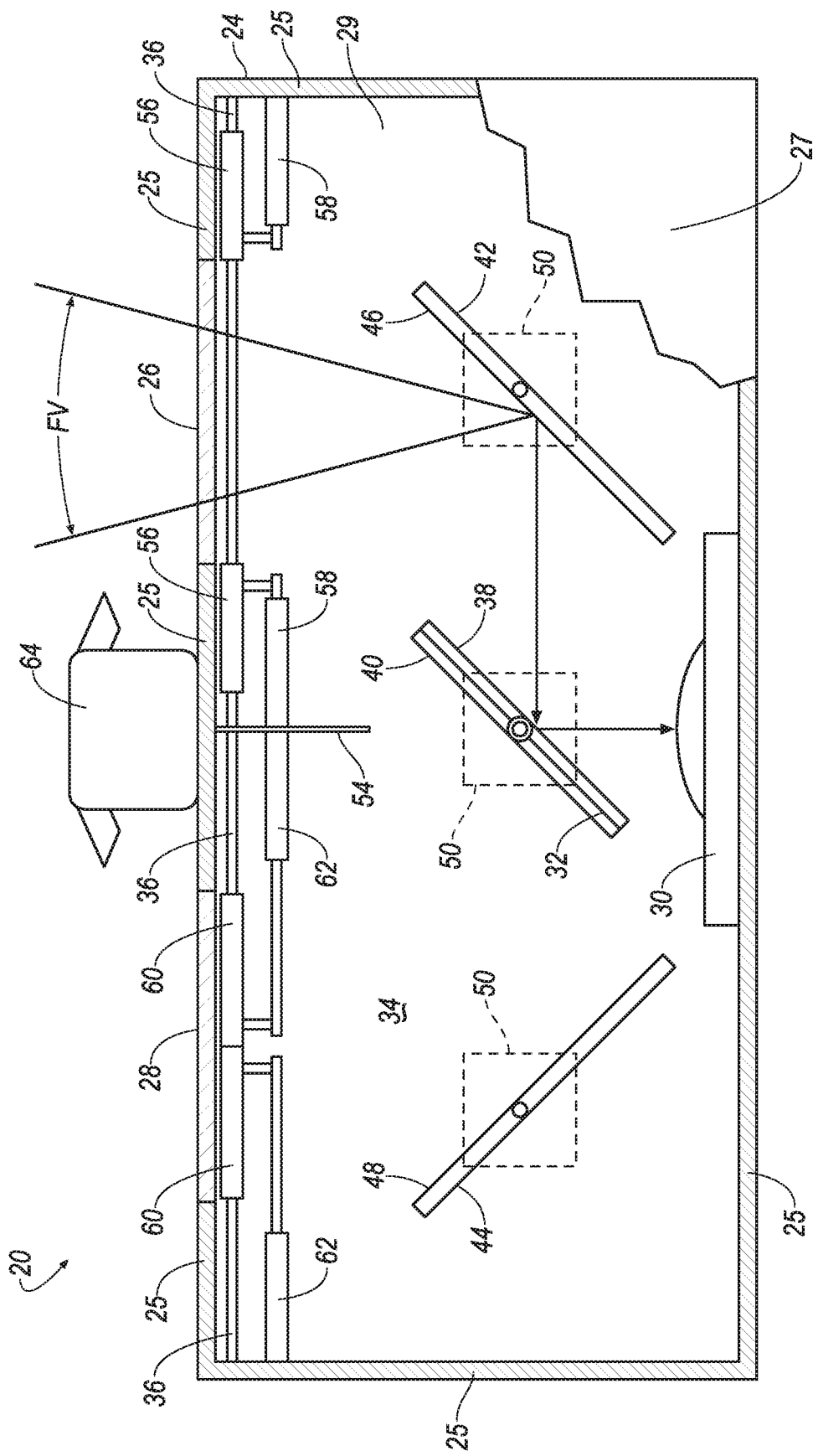
FIG. 4 is a top breakaway view of an alternate embodiment of the example sensor system of FIG. 1.
Figure 5:
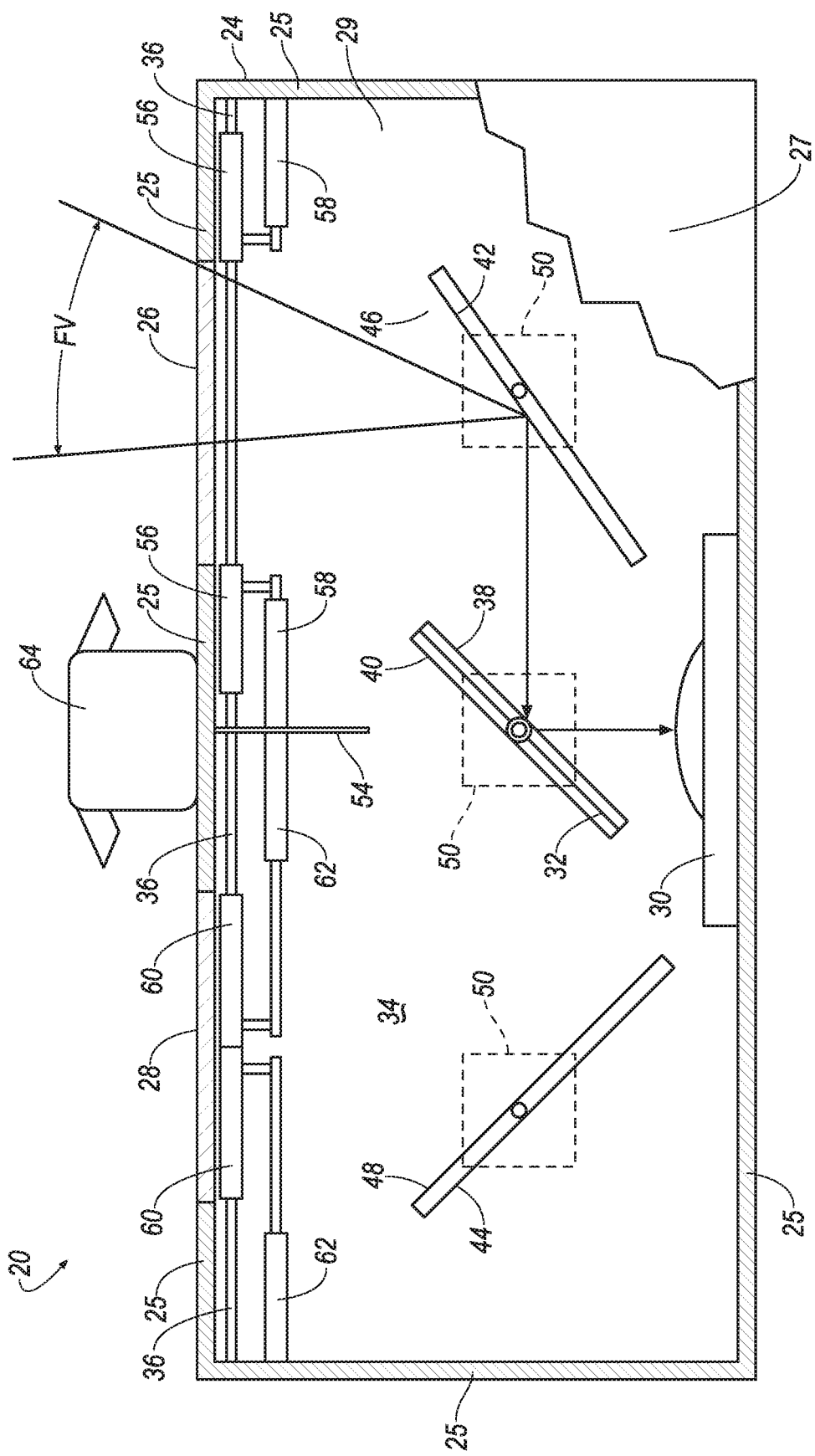
FIG. 5 is a top breakaway view of the alternate embodiment of the example sensor system of FIG. 1 with a mirror of the sensor system in an alternate position.

The mirror 32 is movable between the first position, shown in FIGS. 2, 4 and 5, and the second position, shown in FIG. 3. For example, the mirror 32 may rotate relative to the base 24 between the first position and the second position.

In the first position, the mirror 32 directs light from the first window 26 to the optical sensor 30. For example, light may enter the first window 26 and strike the mirror 32. The light may travel directly from the first window 26 to the mirror 32, or may be reflected off one or more intermediary objects, e.g., a second mirror 42, located therebetween. The mirror 32 in the first position reflects the light such that the light travels from the mirror 32 to the optical sensor 30. For example, the light may strike the first reflective surface 38. The first reflective surface 38 may direct the light to the optical sensor 30 while the mirror 32 is in the first position.

In the second position, the mirror 32 directs light from the second window 28 to the optical sensor 30. For example, light may enter the second window 28 and strike the mirror 32. The light may travel directly from the second window 28 to the mirror 32, or may be reflected off one or intermediary objects, e.g., a third mirror 44, located therebetween. The mirror 32 in the second position reflects the light such that the light travels from the mirror 32 to the optical sensor 30. For example, the light may strike the second reflective surface 40. The second reflective surface 40 may direct light to the optical sensor 30 while the mirror 32 is in the second position.

The second mirror 42 includes a reflective surface 46 that reflects light. The reflective surface 46 may be flat or may be curved. The second mirror 42 may be positioned, e.g., supported by the base 24 at a specific location at a specific angle, to direct light from the first window 26 to the mirror 32 in the first position. For example, light entering the first window 26 may strike the reflective surface 46 of the second mirror 42. The light may reflect off the reflective surface 46 of the second mirror 42 towards the mirror 32, e.g., to strike the first reflective surface 38 of the mirror 32 in the first position.

The second mirror 42 may be immovably supported by the base 24, as shown in FIGS. 2 and 3. For example, the second mirror 42 may be fixed to the base 24, e.g., with an adhesive, a fastener, etc., to prevent relative moment between the second mirror 42 and the base 24. Alternately, the second mirror 42 may be rotatably supported by the base 24, as shown in FIGS. 4 and 5.

The third mirror 44 includes a reflective surface 48 that reflects light. The reflective surface 48 may be flat or may be curved. The third mirror 44 may be positioned to direct light from the second window 28 to the mirror 32 in the second position. For example, light entering the second window 28 may strike the reflective surface 48 of the third mirror 44. The light may reflect off the reflective surface 48 of the third mirror 44 towards the mirror 32, e.g., to strike the second reflective surface 40 of the mirror 32 in the first position.

The third mirror 44 may be immovably supported by the base 24, as shown in FIGS. 2 and 3. For example, the third mirror 44 may be fixed to the base 24, e.g., with an adhesive, a fastener, etc., to prevent relative moment between the third mirror 44 and the base 24. Alternately, the third mirror 44 may be rotatably supported by the base 24, as shown in FIGS. 4 and 5.

The mirrors 32, 42, 44 may define the field of view FV of the optical sensor 30. The field of view FV is an area from which light is detected by the optical sensor 30. Light generated by, and/or reflected off, an object within the field of view FV, and towards the windows 26, 28, is detectable by the optical sensor 30, provided such light is not blocked before reaching the optical sensor 30. Rotation of one or more of the mirrors 32, 42, 44 may alter the field of view FV. For example, rotation of the second mirror 42 may alter the area from which light is detected by the optical sensor 30, as shown in FIGS. 4 and 5.

The sensor system 20 may include a servo 50 coupled to the mirror 32 and operable to rotate the mirror 32 between the first position and the second position. The servo 50 may include a motor, a gear reduction unit, a position sensor, etc. The servo 50 may be actuated to rotate the mirror 32 to a certain position, e.g., the first position, e.g., in response to an instruction from a computer 52. Alternately or additionally, one or more other electromechanical devices, e.g., linear actuators, rack and pinion systems, electromagnetic devices, etc., may be included in the sensor system 20 to rotate and/or move the mirror 32. Additional servos 50 and/or other electromechanical devices may be included in the sensor system 20, e.g., coupled to the second mirror 42 and/or the third mirror 44. The additional servos 50 and/or other electromechanical devices may be configured to rotate the second mirror 42 and/or the third mirror 44, e.g., to alter the field of view FV, as shown in FIGS. 4 and 5.

The sensor system 20 may include a baffle 54 supported by the base 24 and disposed between the first window 26 and the second window 28. The baffle 54 keeps light entering the first window 26 separate from light entering the second window 28. The baffle 54 may extend from wall 25 between the first window 26 and the second window 28 into the chamber 34 towards the mirror 32.

The sensor system 20 may include a first shutter 56 movable between an open position, as shown in FIGS. 2, 4, and 5, and a closed position, as shown in FIG. 3. In the open position light is permitted to travel from the first window 26 to the mirror 32. In the closed position light is restricted from traveling from the first window 26 to the mirror 32. The first shutter 56 may be supported by the base 24. For example, the first shutter 56 may slide between the open position and the closed position along one of the tracks 36. An electromechanical device 58, e.g., a linear actuator, rack and pinion system, electromagnetic device, etc., may be included in the sensor system 20 and configured to move the first shutter 56 between the open position and the closed position, e.g., in response to an instruction from the computer 52.

The sensor system 20 may include a second shutter 60 movable between an open position, as shown in FIG. 3, and a closed position, as shown in FIGS. 2, 4, and 5. In the open position light is permitted to travel from the second window 28 to the mirror 32. In the closed position light is restricted from traveling from the second window 28 to the mirror 32. The second shutter 60 may be supported by the base 24. For example, the second shutter 60 may slide between the open position and the closed position along one of the tracks 36. Another electromechanical device 62 may be included in the sensor system 20 and configured to move the second shutter 60 between the open position and the closed position, e.g., in response to an instruction from the computer 52.

The sensor system 20 may include a cleaning mechanism 64. The cleaning mechanism 64 is configured to clean the first window 26. The cleaning mechanism 64 may include one or more nozzles, liquid reservoirs, valves, pumps, wiper systems, etc., to spray and/or wipe the first window 26, e.g., the one or more nozzles may be directed at the first window. The cleaning mechanism 64 may be configured to clean the second window 28, as described for the first window 26. Alternately, the sensor system 20 may include a second cleaning mechanism configured to clean the second window 28. The cleaning mechanism 64 may be part of a vehicle system, e.g., part of a windshield washing system.

Figure 6:
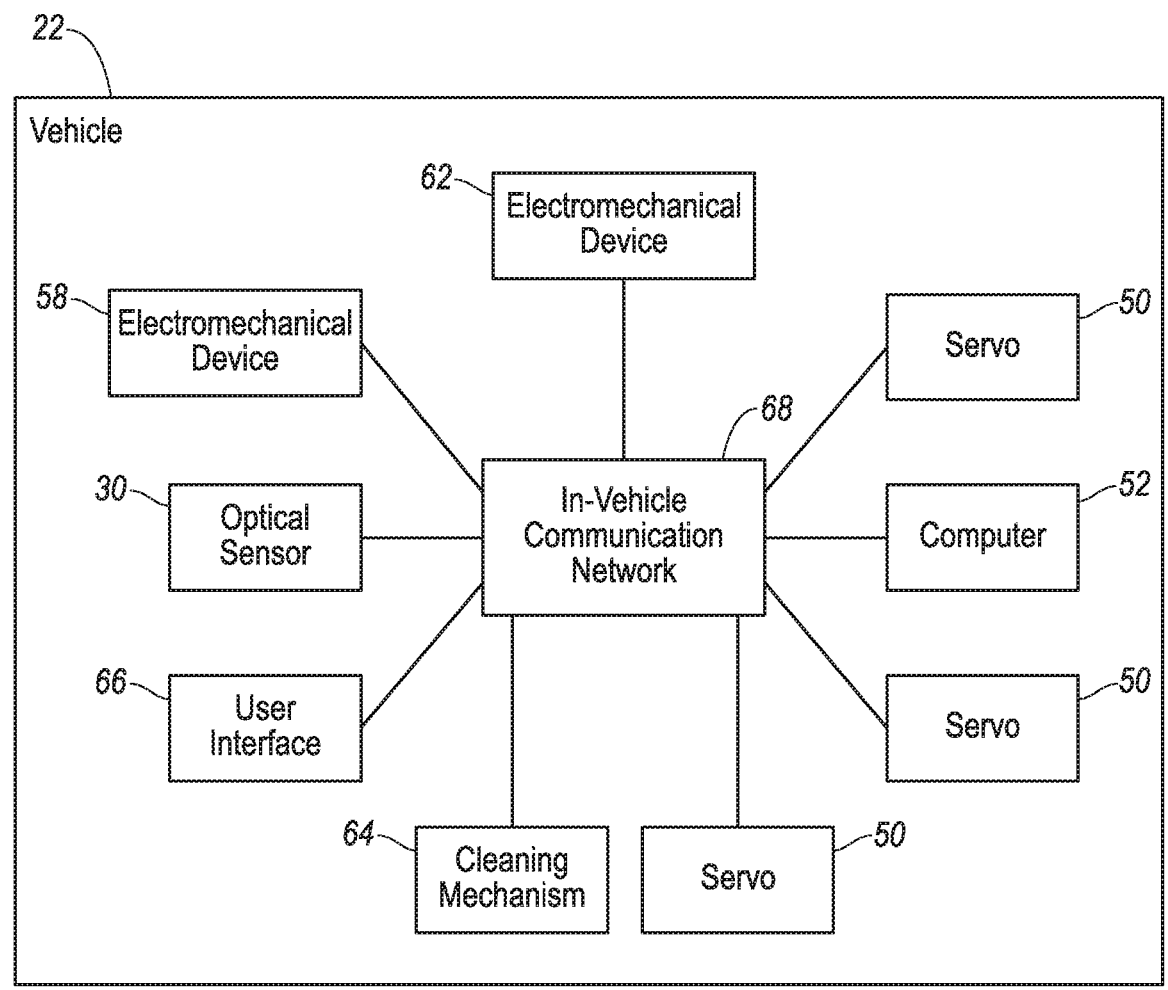
FIG. 6 is a block diagram of the example vehicle and the example sensor system of FIG. 1.

The vehicle 22, shown in FIGS. 1 and 6 may be any passenger or commercial automobile such as a car, a truck, a sport utility vehicle, a crossover vehicle, a van, a minivan, a taxi, a bus, etc. The vehicle 22 may include the sensor system 20, a user interface 66, an in-vehicle communication network 68, and the computer 52.

The vehicle 22 may operate in an autonomous mode, a semi-autonomous mode, or a non-autonomous mode. For purposes of this disclosure, an autonomous mode is defined as one in which each of a vehicle propulsion, braking, and steering are controlled by the computer 52; in a semi-autonomous mode the computer 52 controls one or two of the vehicle propulsion, braking, and steering; in a non-autonomous mode, a human operator controls the vehicle propulsion, braking, and steering.

The user interface 66 presents information to, and receives information from, an occupant of the vehicle 22. The user interface 66 may be located, e.g., on an instrument panel in a passenger cabin of the vehicle 22, or wherever may be readily seen by the occupant. The user interface 66 may include dials, digital readouts, screens such as a touch-sensitive display screen, speakers, and so on for providing information to the occupant, e.g., human-machine interface (HMI) elements. The user interface 66 may include buttons, knobs, keypads, microphone, and so on for receiving information from the occupant.

The in-vehicle communication network 68 includes hardware, such as a communication bus, for facilitating communication among vehicle 22 and system 20 components. The in-vehicle communication network 68 may facilitate wired or wireless communication among the components in accordance with a number of communication protocols such as controller area network (CAN), Ethernet, WiFi, Local Interconnect Network (LIN), and/or other wired or wireless mechanisms.

The computer 52 may be a microprocessor-based computer 52 implemented via circuits, chips, or other electronic components. For example, the computer 52 may include a processor, a memory, etc. The memory of the computer 52 may include memory for storing programming instructions executable by the processor as well as for electronically storing data and/or databases. The computer 52 is generally configured for communications with vehicle 22 components, on a controller area network (CAN) bus, e.g., the in-vehicle communication network 68, and for using other wired or wireless protocols to communicate with devices outside the vehicle 22, e.g., Bluetooth®, IEEE 802.11 (colloquially referred to as WiFi), satellite telecommunication protocols, and cellular protocols such as 3G, LTE, etc. Via the in-vehicle communication network 68 the computer 52 may transmit and/or receive messages, data, instructions, etc., to and/or from various devices in the vehicle 22, e.g., the optical sensor 30, the servo(s) 50, the electromechanical devices 58, 62, the cleaning mechanism 64, the user interface 66, etc. Although one computer 52 is shown in FIG. 6 for ease of illustration, it is to be understood that the computer 52 could include, and various operations described herein could be carried out by, one or more computing devices.

The computer 52 is programmed to actuate the mirror 32 to move from the first position to the second position. For example, the computer 52 may transmit an instruction, e.g., via the in-vehicle communication network 68, to the servo 50 coupled to the mirror 32 instructing actuation of the servo 50 to rotate the mirror 32 to the second position. Similarly, the computer 52 may be programmed to actuate the mirror 32 to move from the second position to the first position. For example, the computer 52 may transmit an instruction to the servo 50 coupled to the mirror 32 instructing actuation of the servo 50 to move the mirror 32 to the first position.

The computer 52 may be programmed to actuate the mirror 32, e.g., to the second position, upon a determination that the first window 26 is contaminated. The computer 52 may determine that the first window 26 is contaminated based on information from the optical sensor 30, e.g., using image 31 recognition processes and methods.

Figure 7:
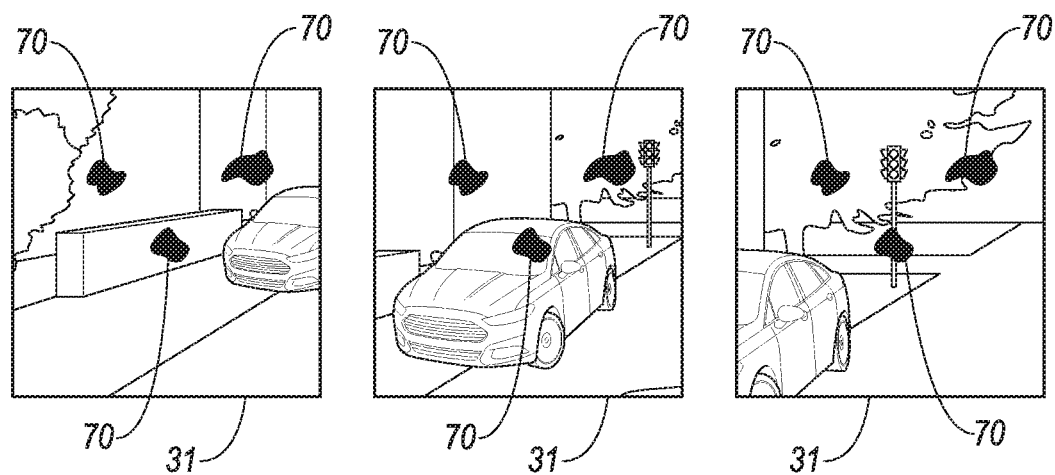
FIG. 7 is an illustration of example images captured by the example sensor system of FIG. 1.

For example, the computer 52 may compare images 31 received from the optical sensor 30, shown in FIG. 7, with each other and identify an artifact 70 that is consistent among the images 31, e.g., dirt on the first window 26 will appear in a consistent location on the images 31 while a remainder of the image 31 will change. Upon identification of a threshold amount, e.g., a number, a total area, etc., of artifacts 70 the computer 52 may determine the first window 26 is contaminated. The area of the artifacts 70 may be compared to a threshold area, e.g., 5 percent of the field of view FV. The number of artifacts 70 may be compared to a threshold amount, e.g., 10 artifacts 70. When the area and/or number of artifacts 70 is greater than the threshold area and/or threshold amount, the computer 52 may determine the first window 26 is contaminated.

For example, the computer 52 may identify the images 31 as being of low quality, e.g., a low resolution resulting from the contamination of the first window 26 interfering with focusing light on the optical sensor 30. The computer 52 may identify a quality of the image 31, e.g. an image resolution. The computer 52 may compare the quality of the image 31 with a quality threshold e.g., a threshold image resolution value. When the quality of the image 31 is less than the quality threshold the computer 52 may determine the first window 26 is contaminated. Other techniques may be used to determine that the first window 26 is contaminated. Similarly, the computer 52 may be programmed to actuate the mirror 32, e.g., to the first position, upon a determination that the second window 28 is contaminated.

The computer 52 may be programmed to actuate the mirror 32, e.g., to the second position, upon a determination that the first window 26 is more contaminated than the second window 28. For example, the computer 52 may identify the area and/or number of artifacts 70 present in the images 31 captured by the optical sensor 30 when the mirror 32 is in first position, and the area and/or number of artifacts 70 present in the images 31 captured by the optical sensor 30 when the mirror 32 is in the second position. The computer 52 may compare the area and/or number of artifacts 70 in the images 31 captured in the first position with the area and/or number of artifacts 70 in the images 31 captured in the second position. When the area and/or number of artifacts 70 in the images 31 captured in the first position is greater than the area and/or number of artifacts 70 in the images 31 captured in the second position the computer 52 determines the first window 26 is more contaminated that the second window 28. Similarly, the computer 52 may be programmed to actuate the mirror 32, e.g., to the first position, upon a determination that the second window 28 is more contaminated than the first window 26.

The computer 52 may be programmed to actuate the first shutter 56 to the closed position, e.g., from the open position. For example, the computer 52 may transmit an instruction, e.g., via the in-vehicle communication network 68, to the electromechanical device 58 configured to move the first shutter 56. Similarly, the computer 52 may be programmed to actuate the first shutter 56 to the open position, e.g. from the closed position.

The computer 52 may be programmed to actuate the second shutter 60 to the closed position, e.g., from the open position. For example, the computer 52 may transmit an instruction, e.g., via the in-vehicle communication network 68, to the electromechanical device 62 configured to move the second shutter 60. Similarly, the computer 52 may be programmed to actuate the second shutter 60 to the open position, e.g. from the closed position.

The computer 52 may be program to actuate the second shutter 60 to the closed position while the first shutter 56 is in the closed position. For example, the computer 52 may first instruct actuation of the first shutter 56 to the closed position, and then instruct actuation of the second shutter 60 to the closed position without instructing the first shutter 56 to the open position. Similarly, the computer 52 may be programmed to actuate the first shutter 56 to the closed position while the second shutter 60 is in the closed position.

The computer 52 may be programmed to actuate the second shutter 60 to the open position upon actuation of the first shutter 56 from the open position to the closed position. For example, the computer 52 may instruct actuation of the first shutter 56 to the closed position and instruct actuation of the second shutter 60 to the open position. Similarly, the computer 52 may be programmed to actuate the first shutter 56 to the open position upon actuation of the second shutter 60 from the open position to the closed position.

The computer 52 may be programmed to actuate the cleaning mechanism 64 to clean the first window 26. For example, the computer 52 may transmit an instruction, e.g., via in-vehicle communication network 68, instructing actuation of the cleaning mechanism 64 to spray and/or wipe the first window 26. The computer 52 may actuate the cleaning mechanism 64 upon actuating the mirror 32 to move from the first position to the second position. Similarly, the computer 52 may actuate the cleaning mechanism 64 to clean the second window 28, e.g., upon actuating the mirror 32 to move to the first position.

The computer 52 may be programmed to actuate movement of the second mirror 42 to alter the field of view of the optical sensor 30 while the mirror 32 is in the first position. For example, the computer 52 may transmit an instruction, e.g., via the in-vehicle communication network 68, instructing actuation of the servo 50 and/or other electromechanical device(s) coupled to the second mirror 42 to move the second mirror 42 and alter the field of view FV. Similarly, the computer 52 may be programmed to actuate movement of the third mirror 44 to alter the field of view FV while the mirror 32 is in the second position.

The computer 52 may be programmed to navigate the vehicle 22 based on data received from the optical sensor 30. For example, the computer 52 may operate in the autonomous mode or the semi-autonomous mode based on the data received from the optical sensor 30. For example, the computer 52 may process the data using image recognition techniques to identify and maintain a lane of travel, to identify and avoid an object outside the vehicle 22, e.g., another vehicle, etc.

The computer 52 may be programmed to power down the vehicle 22. For example, the computer 52 may be programmed to place the vehicle 22 components in an "off" or "standby" state. In the "off" or "standby" state the vehicle 22 components do not operate, or operate at a lower power level as compared to normal operation, thereby preserving vehicle 22 resources for later use. The computer 52 may power down the vehicle 22 in response to user input to the user interface 66.

Figure 8:
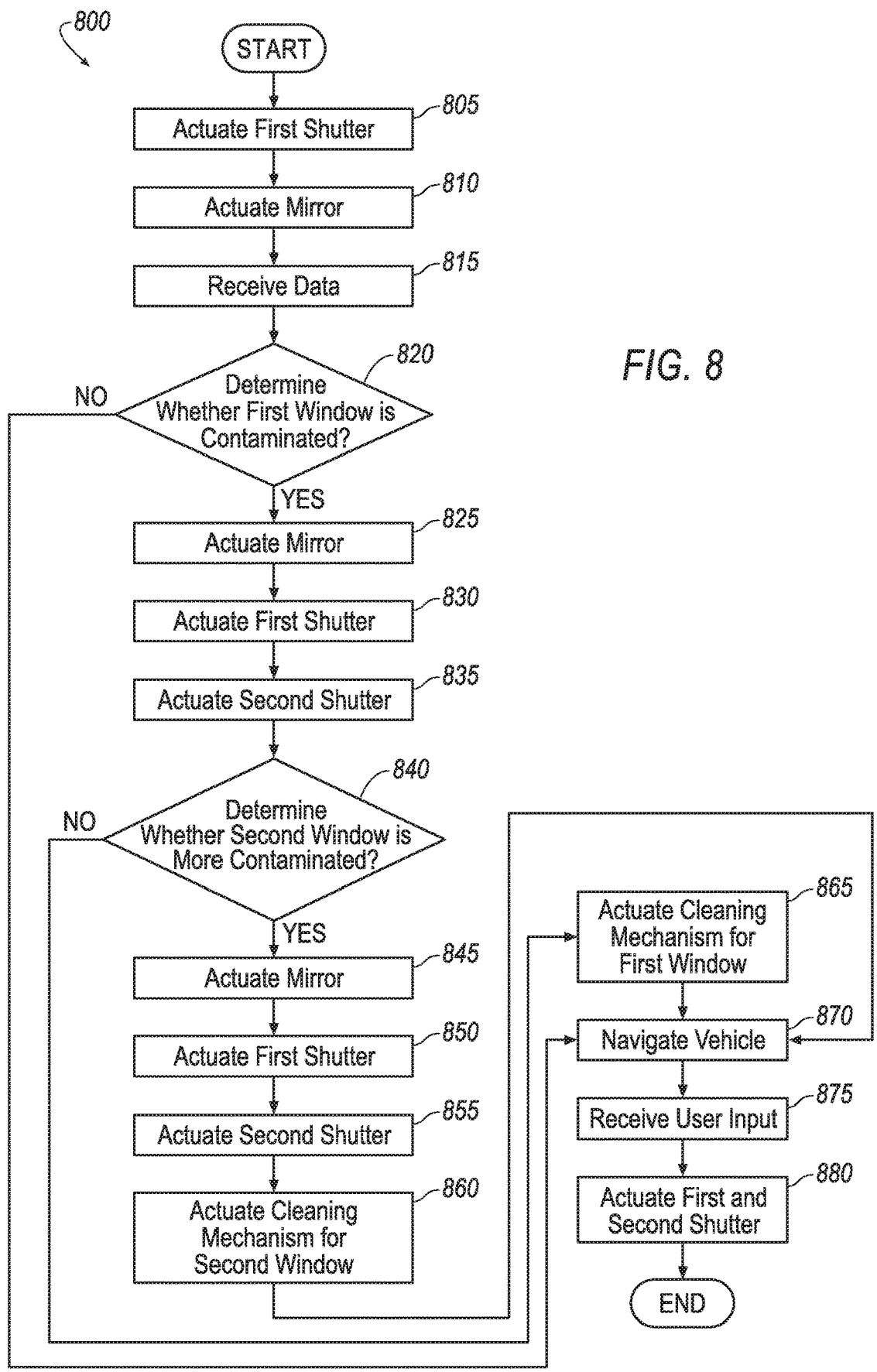
FIG. 8 is an example process of operating the example sensor system of FIG. 1.

FIG. 8 is a process flow diagram illustrating an exemplary process 800 for operating the sensor system 20. The process 800 begins in a block 805 in which the computer 52 actuates the first shutter 56 to the open position, as described herein.

At a block 810 the computer 52 actuates the mirror 32 to the first position, as described herein.

At a block 815 the computer 52 receives data from the optical sensor 30, e.g., via the in-vehicle communication network 68. The computer 52 may continue to receive data from the optical sensor 30 throughout the process 800. Throughout the process 800 means substantially continuously or at time intervals, e.g., every 200 milliseconds.

Next, at a block 820 the computer 52 determines whether the first window 26 is contaminated, as described herein. Upon a determination that the first window 26 is contaminated the process 800 moves to a block 825. Upon a determination that the first window 26 is not contaminated the process 800 moves to a block 870.

At the block 825 the computer 52 actuates the mirror 32 the to the second position, as described herein.

At a block 830 the computer 52 actuates the first shutter 56 to the closed position, as described herein.

At a block 835 the computer 52 actuates the second shutter 60 to the open position, as described herein.

Next, at a block 840 the computer 52 determines whether the second window 28 is more contaminated than the first window 26, as described herein. Upon a determination that the second window 28 is more contaminated that the first window 26 the process 800 moves to a block 845. Upon a determination that the second window 28 is not more contaminated that the first window 26 the process 800 moves to the block 865.

At the block 845 the computer 52 actuates the mirror 32 to the first position, as described herein.

At a block 850 the computer 52 actuates the first shutter 56 to the open position, as described herein.

At a block 855 the computer 52 actuates the second shutter 60 to the closed position, as described herein.

At a block 860 the computer 52 actuates the cleaning mechanism 64 to clean the second window 28, as described herein.

At the block 865 the computer 52 actuates the cleaning mechanism 64 to clean the first window 26, as described herein.

At the block 870 the computer 52 navigates vehicle 22, as described herein. While the vehicle 22 is navigated the computer 52 may continue to determine whether the first window 26 is contaminated, determine whether the second window 28 is contaminated, actuate the mirror 32 between the first position and the second position, actuate the first shutter 56 and the second shutter 60 between the open positions and the closed positions, etc., as described herein. While the vehicle 22 is navigated the computer 52 may actuate the second mirror 42 to alter the field of view FV of the optical sensor 30, as described herein.

At a block 875 the computer 52 receives input to the user interface 66 requesting the vehicle 22 be powered down.

Next, at a block 880 the computer 52 actuates the first shutter 56 and the second shutter 60 to the closed positions. Additionally, the computer 52 powers down the vehicle 22. After the block 880 the process 800 may end.

The adjectives "first" and "second" are used throughout this document as identifiers and are not intended to signify importance or order.

As used herein a computing device, e.g., a computer, includes a processor and a memory. The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data and execute the processes described herein.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors. The memory may store program instruction executable by the processor to perform the processes described herein.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The phrase "based on" encompasses being partly or entirely based on.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
    a base defining a chamber, the base having a first window and a second window spaced from the first window, the first window and the second window permitting light to enter the chamber, the base having a track;
    an optical sensor supported by the base;
    a single mirror supported by the base and movable between a first position and a second position, in the first position the single mirror directs light from the first window to the sensor, and in the second position the single mirror directs light from the second window to the sensor; and a shutter slidable along the track between an open position permitting light to travel from the first window to the single mirror and a closed position covering the first window and restricting light traveling from the first window to the single mirror;

wherein the single mirror includes a first reflective surface that directs light to the sensor in the first position and a second reflective surface that directs light to the sensor in the second position.

2. The system of claim 1, further comprising a second mirror positioned to direct light from the first window to the mirror in the first position.

3. The system of claim 2, wherein the second mirror is immovably supported by the base.

4. The system of claim 2, wherein the second mirror is rotatably supported by the base.

5. The system of claim 1, further comprising a baffle supported by the base and disposed between the first window and the second window.

6. The system of claim 1, further comprising a cleaning mechanism configured to clean the first window.

7. The system of claim 1, further comprising a servo coupled to the single mirror and operable to rotate the single mirror between the first position and the second position.

8. The system of claim 1, wherein the first window and the second window face a same direction.

9. A system, comprising a computer having a processor and a memory storing program instructions executable by the processor to:

capture, with an optical sensor, a first image while a mirror is at a first position in which the mirror directs light from a first window to the optical sensor and a second image while the mirror is at a second position in which the mirror directs light from a second window to the optical sensor;

compare an area or number of artifacts in the first image with an area or number of artifacts in the second image;

determine that the first window is more contaminated than the second window based on the comparison of the area or number of artifacts in the first image with the area or number of artifacts in the second image; and upon determining that the first window is more contaminated than the second window, actuate the mirror to move from the first position to the second position.

10. The system of claim 9, wherein the instructions include instructions to, upon determining that the first window is contaminated, actuate a shutter from an open position permitting light to travel from the first window to the mirror to a closed position restricting light traveling from the first window to the mirror.

11. The system of claim 10, wherein the instructions include instructions to, upon actuation of the shutter from the open position to the closed position, actuate a second shutter to an open position permitting light to travel from the second window to the mirror.

12. The system of claim 9, wherein the instructions include instructions to actuate a cleaning mechanism to clean the first window upon actuating the mirror to move from the first position to the second position.

13. The system of claim 9, wherein the instructions include instructions to actuate movement of a second mirror to alter a field of view of the sensor while the mirror is in the first position, the second mirror positioned to direct light from the first window to the mirror in the first position.

14. The system of claim 9, wherein the instructions include instructions to, upon determining that the first window is contaminated, actuate a first shutter to a closed position restricting light traveling from the first window to the mirror, and to actuate a second shutter to a closed position restricting light traveling from the second window to the mirror while the first shutter is in the closed position.

15. The system of claim 9, wherein the instructions include instructions to operate a vehicle in an autonomous mode or a semi-autonomous mode based on data received from the sensor.

* * * * *